US009755892B2

(12) United States Patent
Campbell et al.

(10) Patent No.: US 9,755,892 B2
(45) Date of Patent: Sep. 5, 2017

(54) INTEGRATED DEVICE MANAGMENT OVER ETHERNET NETWORK (71) Applicant: INTERNATIONAL BUSINESS MACHINES CORPORATION, Armonk, NY (US)

(72) Inventors: Alexander P. Campbell, Kanata (CA); Keshav G. Kamble, Fremont, CA (US); Vijoy A. Pandey, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 100 days.

(21) Appl. No.: 14/071,231

(22) Filed: Nov. 4, 2013

(65) Prior Publication Data
US 2014/0056175 A1 Feb. 27, 2014

Related U.S. Application Data (63) Continuation of application No. 13/552,005, filed on Jul. 18, 2012, now Pat. No. 8,891,405.

(51) Int. Cl.
*H04L 12/24* (2006.01)
*H04L 12/54* (2013.01)
*H04L 12/931* (2013.01)
*H04L 12/933* (2013.01)

(52) U.S. Cl.
CPC .......... *H04L 41/0803* (2013.01); *H04L 12/56* (2013.01); *H04L 49/15* (2013.01); *H04L 49/351* (2013.01); *H04L 49/65* (2013.01)

(58) Field of Classification Search
CPC ...... H04L 12/24; H04L 49/10–49/9094; H04L 41/02–41/5096
See application file for complete search history.

(56) References Cited

U.S. PATENT DOCUMENTS

| 6,822,944 | B1 | 11/2004 | Mantin |
| 6,925,257 | B2 | 8/2005 | Yoo |
| 6,957,283 | B2 * | 10/2005 | Dhir et al. ...................... 710/10 |
| 7,209,477 | B2 | 4/2007 | Pike |
| 7,397,796 | B1 | 7/2008 | Smiljanic |
| 8,014,301 | B2 | 9/2011 | Kuo et al. |
| 8,135,002 | B2 | 3/2012 | Ryan et al. |
| 8,428,458 | B2 | 4/2013 | Sindhu |
| 2005/0207414 | A1 | 9/2005 | Duvvury |
| 2007/0047540 | A1 | 3/2007 | Bragg et al. |
| 2008/0126321 | A1 * | 5/2008 | Chong et al. ...................... 707/3 |
| 2008/0238477 | A1 | 10/2008 | Feng et al. |
| 2009/0235222 | A1 * | 9/2009 | Raje et al. ...................... 716/16 |
| 2009/0259878 | A1 | 10/2009 | Remlin et al. |

(Continued)

*Primary Examiner* — Lakeram Jangbahadur
(74) *Attorney, Agent, or Firm* — Shimokaji IP (57) ABSTRACT A clustered network may include a plurality of switch boxes where a master switch box may communicate and control hardware devices in remote switch boxes. The switch boxes in the network may each include a multiplexer, for example, a field programmable array (FPGA) that may process message requests related to hardware devices of a switch box. If the hardware device is in a remote switch box, then the FPGA of the master switch box may process the status data from the remote switch box so that a local processor in the master switch box can read the status data.

5 Claims, 6 Drawing Sheets (56) References Cited

U.S. PATENT DOCUMENTS

| | | |
|---|---|---|
| 2011/0047424 A1 | 2/2011 | Bailey et al. |
| 2011/0085560 A1 | 4/2011 | Chawla et al. |
| 2011/0268120 A1 | 11/2011 | Vobbilisetty et al. |
| 2012/0029898 A1 | 2/2012 | Carroll et al. |
| 2012/0246510 A1 | 9/2012 | Kojina |
| 2013/0067156 A1 | 3/2013 | Cho |
| 2013/0091316 A1 | 4/2013 | Fullerton et al. |
| 2013/0101289 A1 | 4/2013 | Graham et al. |
| 2013/0201873 A1 | 8/2013 | Anantharam et al. |
| 2013/0230322 A1 | 9/2013 | Sindhu |

* cited by examiner

EL2T PACKET FORMAT

| ETHERNET HEADER | EL2T HEADER | TLV + EL2T PAYLOAD |

```
/* EL2T Header - used for EL2T transmission */
tlv_{
    uint8       proto_type;    /* 8 bit value which indicates different types of messages. */
    uint16      proto_len;     /* 16 bit value which indicates the length of the message. */
    int         proto_value;   /* 32 bit value of the operation. */
}TLV;

eth_pkt_{
    uint8       dest_mac;
    uint8       src_mac;
    uint16      ether_type;    /* 0x88b7 */
}ETH_HDR el2t_hdr{
    TLV         el2t_tlv;
    uint16      el2t_rev;
    int         client_id;
    uint16      hdr_flags;     /* NO_ACK_REQD, etc */
    uint16      seq_no;
    uint16      payload_len;
} el2t_hdr_t;
```

INTEGRATED DEVICE MANAGMENT OVER ETHERNET NETWORK

RELATED APPLICATIONS

The present continuation application claims the benefit of priority of U.S. application Ser. No. 13/552,005, filed Jul. 18, 2012, which application is incorporated herein by reference in its entirety.

BACKGROUND

The present invention relates to network management, and more specifically, to integrated device management over an Ethernet network.

In CLOS configurations, multiple network switches can be deployed into a full mesh network. In some configurations, switches are grouped together in switch boxes providing increased switching capabilities at a physical point. In a scaled out network, 32, 64, or 128 switch boxes, for example, may be connected together in a full mesh formation.

Apart from network switching ASICs, network switch boxes typically also include a processor to control peripheral hardware devices that supply switching related functions. The processor is typically connected to local peripheral hardware through local bus lines. The processor configuration may be mapped directly to the hardware devices (for example, to device addresses) in the switch and the different port configurations. For example, the processor may be configured to enable ports, manage IP interfaces, and manage protocols. A switch box may typically include one processor that operates as a management plane and control plane, providing management capabilities and controlling hardware, protocols. Thus, in scaled out systems, a management point may typically be confined to communicating with local devices and there may be several management points requiring maintenance and monitoring of the local devices at each switch.

In network management, troubleshooting for a switch box typically occurs at the local level. An interface may be connected to each management point through a port in the switch. An administrator or technician may use a scripting mechanism through the interface to configure the processor in each switch independently. Once configured, the management point may be interfaced to control and monitor the performance of components, for example, ports in the switch. The management point may be accessed to request, for example, logs, port management data and health status of devices connected to the switch.

For each switch box in the network that requires maintenance, the administrator or technician typically has to troubleshoot a switch at the switch's physical location. An administrator may thus be challenged to provide real time services in a scaled out network where switch boxes may be numerous and some may be in physically distant locales. For example, when an interrupt occurs, the processing environment may crash requiring immediate attention from an administrator. Otherwise applications being handled by the network may not continue and transactions related to those applications can be lost. Some events, for example, a cooling fan becoming inoperable, may require imminent action before overheating occurs, however, when the fan is on a remote switch, the administrator may need to go on site to remedy the situation. As described above, when setting up a scaled out network, each switch box may require independent set-up and configuration. The manpower and time needed to set up and manage a scaled out network may thus, be cost ineffective.

SUMMARY

According to one embodiment of the present invention, a central processing unit (CPU); one or more hardware devices including one or more switch boxes; and a processor in communication with the CPU and the one or more hardware devices, wherein the processor is configured to: multiplex signals between the one or more hardware devices in the switch box and the CPU, and manage hardware devices of other network switch boxes, in a clustered network, through said processor.

According to another embodiment of the present invention, a networking system comprises a plurality of clustered member switch boxes; a master switch box among the plurality of member switch boxes; and a network link connecting the master switch box to the plurality of member switch boxes, wherein each of the master switch box and the member switch box include respectively: a central processing unit (CPU), and one or more hardware devices, wherein the CPU of the master switch box is configured to communicate with the one or more hardware devices of the one or more member switch boxes.

According to yet another embodiment of the present invention, a process of managing device hardware in a clustered network of switch boxes comprises electing a master switch box; transmitting a status request from a central processing unit (CPU) in the master switch box to a hardware device in a member switch box in the network; receiving a status update from the member switch corresponding to the status request through a multiplexer device in the master switch box; and transmitting the status update from the multiplexer to the CPU.

According to still yet another embodiment of the present invention, a computer program product for managing hardware devices in a clustered network, the computer program product comprising a computer readable storage medium having computer readable program code embodied therewith, the computer readable program code being configured to: enable a first member switch box in the network as master switch box; identify a second member switch box in the network for evaluation of hardware devices in the second member switch box; transmit a status request from a central processing unit (CPU) in the master switch box to a hardware device in the second member switch box, wherein the CPU is configured to communicate with a same hardware device in the master switch box; receive the status request through a multiplexer device in the master switch box; and transmit the status request from the multiplexer to the processor along a line connected between the same hardware device in the master switch box and the CPU.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As generally described herein, management of network switches may employ a multiplexing device inside a network switch box that allows a management point of one switch box to communicate with and monitor hardware devices of another switch box in a network. Embodiments may simulate at the management point in a switch box the perception that an entire cluster of switch boxes may be viewed as a single switch box where the switch resides. Exemplary embodiments of the present invention may provide for one switch box to control and manage other switch boxes in the clustered network. The multiplexing device may be configured to simulate data received from a remote hardware device as being configured for communication with the processor at the management point. Thus, software implementation acceleration, set up acceleration, monitoring, and troubleshooting may be accomplished from any one switch box in the network.

Figure 1:
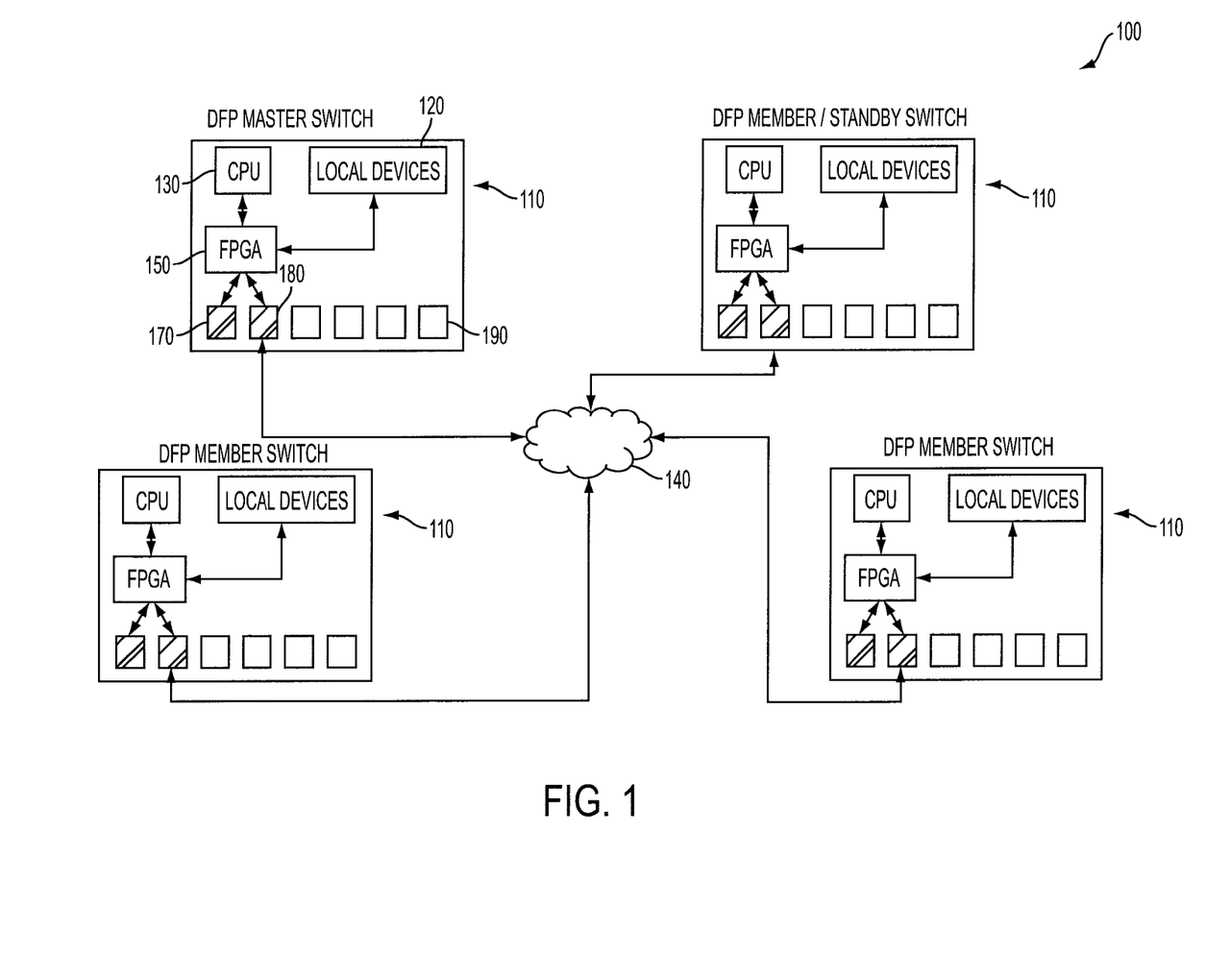
FIG. 1 is a block diagram of a networking system in accordance with an exemplary embodiment of the present invention.

Referring now to FIG. 1, a networking system 100 is shown according to an exemplary embodiment of the present invention. The networking system 100 may be a clustered Ethernet network, for example, a non-blocking switching fabric. The networking system 100 may include a plurality of member switch boxes 110 in communication with each other through a network link 140. The network link 140 may be a hub, a router, a data bus, or more switches, for example.

In an exemplary embodiment, the member switch boxes 110 may include identical features that allow one member switch box 110 to communicate with and manage other member switch boxes 110 in the networking system 100. The member switch boxes 110 may be configured to elect the one member switch box 110 to operate as a master switch box monitoring and managing functions and performance in the other member switch boxes 110. For example, the member switch boxes 110 may exchange protocol data with one another and may determine that the member switch box 110 with the lowest media access control (MAC) address may be the master switch box. The member switch boxes 110 may also be configured to designate some of the switch boxes as standby master switch boxes so that if the master switch box is unable to perform, the next closest standby switch box may assume control of the cluster. In another example, an administrator or other user may interface with any member switch box 110 and enable the switch box to be a master switch box. The administrator may access and control any other member switch box 110 though the master switch.

Figure 2:
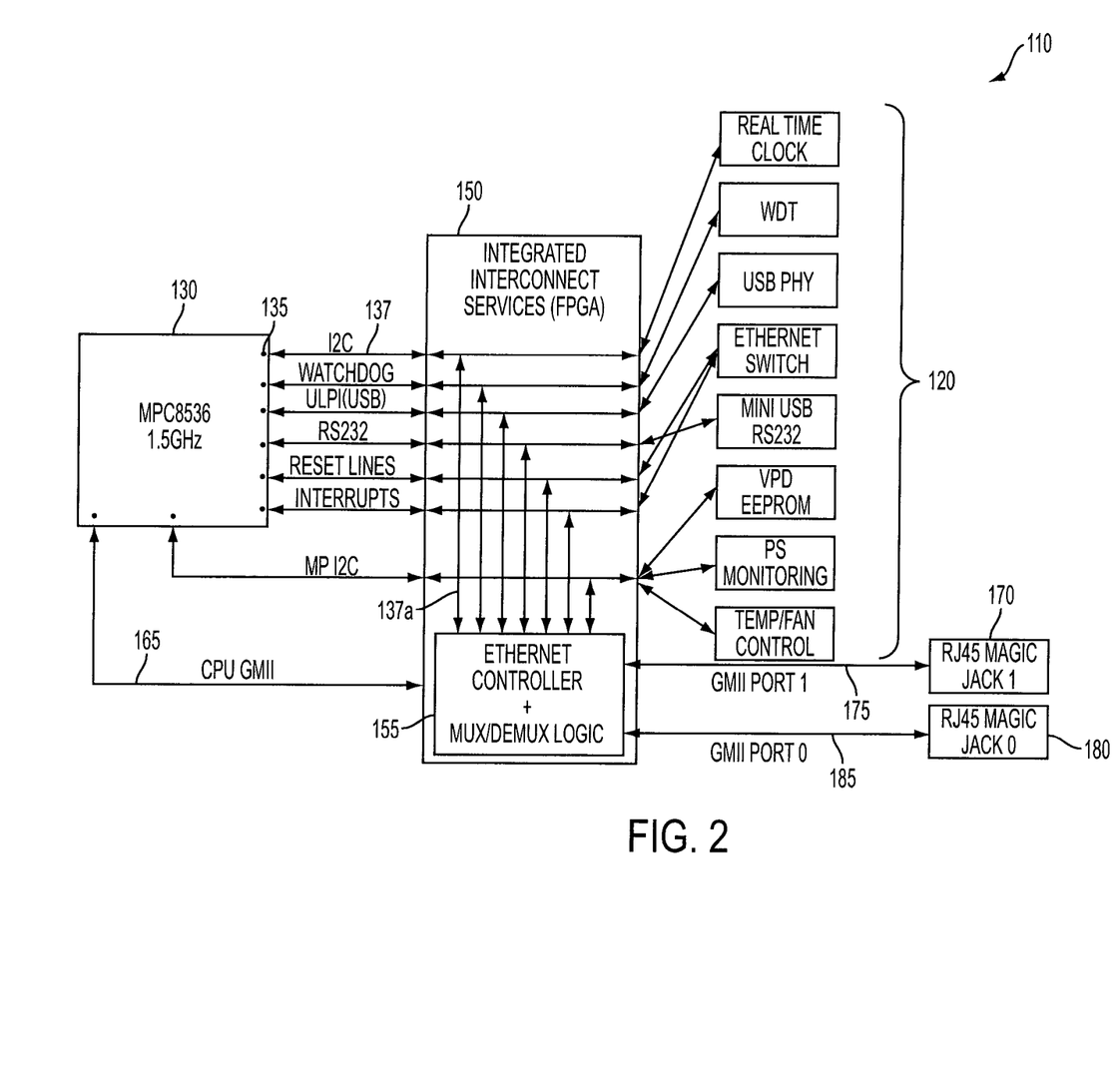
FIG. 2 is a block diagram showing multiplexer logical connections within a switch of the networking system of FIG. 1.
Figure 3:
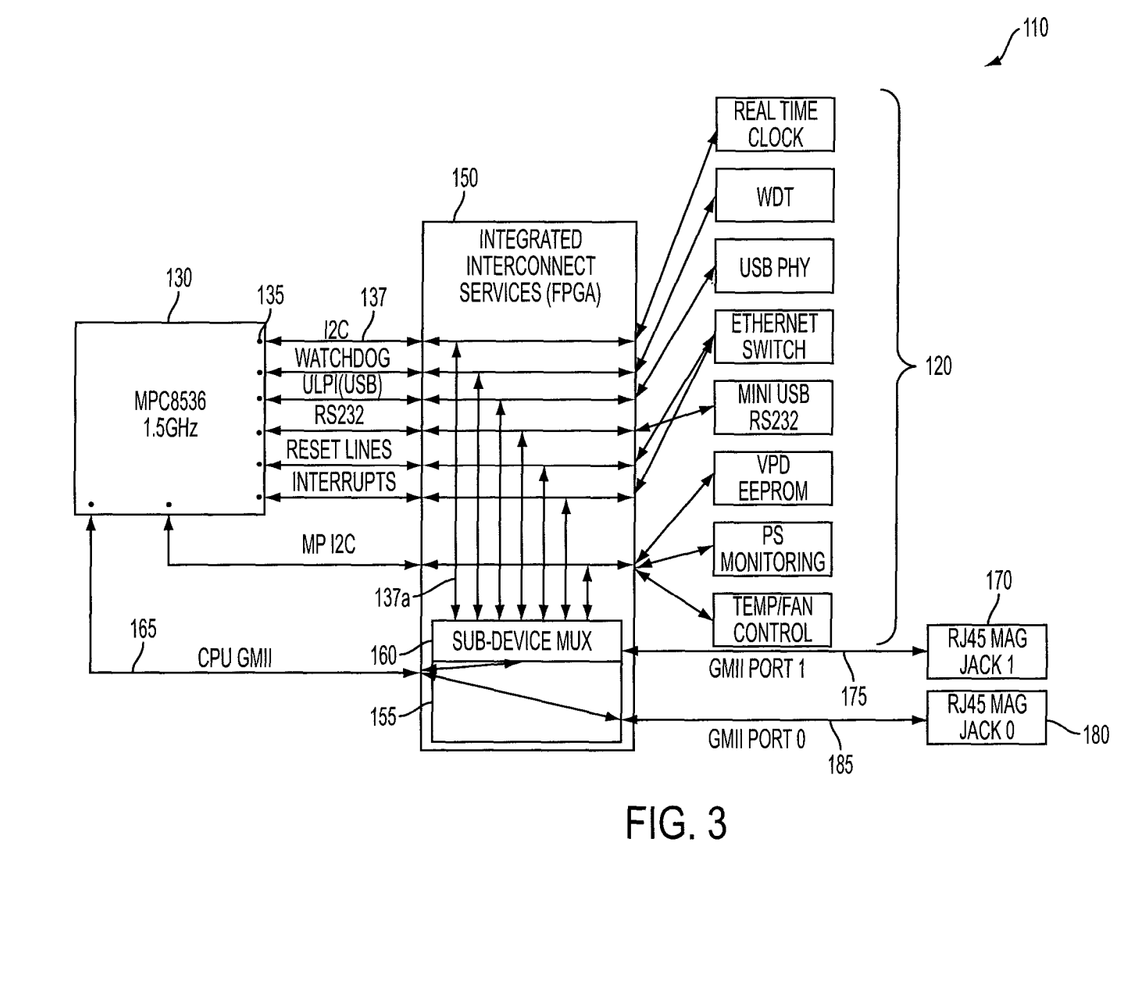
FIG. 3 is a block diagram showing data pathway connections through a multiplexer in the switch of FIG. 2.

The switch boxes 110 may each include hardware devices 120, a computer processing unit (CPU) 130, a multiplexer 150, Ethernet management ports 170, 180, and general data ports 190. The hardware devices 120 may include one or more Ethernet switches and/or various peripherals related to switching functions. Examples of peripheral hardware devices 120 are shown in FIGS. 2 and 3. The multiplexer 150 may be configured to mux and demux data transmitted from the CPU 130 with local hardware devices 120 in the switch box 110. The multiplexer 150 may also be configured to mux and demux data received by the switch box 110 from remote hardware devices 120 of other switch boxes 110 in the networking system 100. The multiplexer 150 may be, in an exemplary embodiment, a processor with I/I ports configured for mux/demux operations. For example, the multiplexer 150 may be a microprocessor or a field programmable gate array (FPGA) and hereafter may be referred interchangeably as the processor 150 or the FPGA 150. One management port 170 may be configured for general management of the switch box 110. For example, an administrator may access, from a management interface, the switch box 110 for use as a master switch box through the port 170. The CPU 130 may receive management commands through the port 170. Another management port 180 may serve as the primary communication interface between member switch boxes 110. Requests and receipt of data to and from the master switch box 110 may be handled by the port 180. The general ports 190 may be configured to communicate data to other devices (not shown) connected to the networking system 100. For sake of illustration, the management ports 170 and 180 are cross-hatched to distinguish them from the general ports 190. The networking system 100 may employ a distributed fabric protocol enabling communication.

Referring now to FIG. 2, details of the switch box 110 and logical connections between features of the switch box are shown. Various types of I/O busses may be simulated over the management port 180 via the multiplexer 150. The multiplexer 150 may simulate and map all the peripheral hardware devices 120 of remote member switch boxes 110 on the management port 180 of master switch box CPU 130. The CPU 130 may include pins 135 that are associated with and configured to communicate with predetermined hardware devices 120. For example, a pin 135 is shown as corresponding to a real time clock (peripheral hardware device 120) with communication occurring along a bus 137. The bus 137 between the pin 135 and the real time clock 120 shown may be an I2C bus. For sake of illustration only a single pin 135 and bus 137 are marked, however, each peripheral hardware device 120 may communicate with its respective pin 135 along a predetermined bus 137 as shown. For example, other peripheral devices 120 and their busses 137 may include the following. A watchdog clock (timer) may be connected to the CPU 130 along a I2C bus 137. A universal serial bus physical interface (USB PHY chip) may be connected to the CPU 130 along a ULPII bus 137. A mini USB RS232 port may be connected to the CPU 130 along an RS232 bus. An Ethernet switch may be connected to the CPU 130 along two busses; a "reset lines" bus and an "interrupts" bus. A VPD EEPROM, a power supply monitoring device, and a temperature/fan control device may be connected to the CPU 130 along a MP I2C bus. The processor 150 may be disposed in between connections of the CPU 130 and the hardware devices 120. For example, when the processor 150 is inserted into place, the I2C bus 137 may run from the real time clock through the processor 150 and to the pin 135 corresponding to the I2C bus 137.

The processor 150 may include an Ethernet controller 155 programmed with multiplexing/demultiplexing logic. The member switch box 110 may also include a line 165 connected to the Ethernet controller 155 designated to communicate with other member switch boxes 110. Input/output lines 175, 185 may be connected between the Ethernet controller 155 and the management ports 170 and 180. The Ethernet controller 155 may connect to the same peripheral devices 120 on another switch box 110 that are connected to the present switch box 110. In an exemplary embodiment, the Ethernet controller 155 may include busses 137*a* that correspond to busses 137 connected between the present peripheral hardware devices 120 and CPU 130. For example, the Ethernet controller 155 may include an I2C bus 137*a* that is connected to the I2C bus 137. The Ethernet controller 155 may also include the following busses 137*a*: a watchdog bus 137*a* connected to the watchdog bus 137; a ULPII bus 137*a* connected to the ULPII bus 137; an RS232 bus 137*a* connected to the RS232 bus 137; a "reset lines" bus 137*a* connected to the "reset lines" bus 137; an "interrupts" bus 137*a* connected to the "interrupts" bus 137; and an MP I2C bus 137*a* connected to the MP I2C bus 137.

Referring to FIG. 3, details showing a multiplexing logic between member switch boxes 110 are shown. For sake of illustration, the following will be described primarily in the context of checking status updates of hardware devices 120. However it will be understood that other processes may be performed. For example, the temperature of the remote switch box 110 may be controlled by the master switch box 110 by sending commands from the master switch box 110 to the remote switch box processor 150 and temperature/fan control device. In another example, the Ethernet switch of the remote switch box 110 may be reset by the master switch box 110. The master switch box 110 may send a reset command to the remote switch box 110 that may be received and processed by remote switch box processor 150 and forwarded along "reset lines" bus 137*a* to the Ethernet switch.

The switch box 110 in FIG. 3 is may be similar to that shown in FIG. 2 except that the Ethernet controller 155 may include a sub-device multiplexer 160 configured to receive status update signals from other member switch boxes 110 for transmission to the CPU 130. The processor 150 may be configured to distinguish between status data of a local hardware device 120 and status data of a remote hardware device 120. In an exemplary operation of the switch box 110, a network administrator or other user (not shown) may enable the switch box 110 to operate as a master switch box. The user may wish to check or manage the status of a hardware device 120 either locally or on another member switch box 110 in the network system 100.

In performing a local status check, the administrator may send a request from the CPU 130 that may be routed through the processor 150. The request may include a data packet identifying the source MAC address as local thereby providing the processor 150 identification that the request is for a local hardware device 120. The processor 150 may access the bus 137 corresponding to the requested hardware device 120 and retrieve a status update or other information related to the hardware device 120. Being that the pin 135 may already be configured for reading data from that local hardware device 120, the processor 150 may route the status update to the corresponding pin 135 without further processing.

The administrator may also access and control remote hardware devices 120 through the master switch box 110. For example, if the administrator wishes to check a slot of a remote member switch box 110 the user may perform a status request from the master switch box 110 to a hardware device 120 in that slot of the remote member switch box 110. The CPU 130 of the master switch box 110 may transmit a status request through the line CPU GMII line 165 that may go through GMII port 1 line 175 and management port 170 to the member switch box 110. The request message may be an Ethernet packet with an Enhanced Layer2 Transport Protocol (EL2T) PDU inside it. The status request may include a source address corresponding with the processor 150 in the master switch box 110. The status request may be received by the Ethernet controller 155 of the remote member switch box 110 where the sub-device multiplexer 160 may obtain the status of the targeted hardware device 120. The status update of the hardware device 120 may be returned along its busses 137 and 137a to the Ethernet controller 155 of the remote member switch box 110 where it may be processed and transmitted back to the master switch box 110 port 170. The Ethernet controller 155 in the master switch box 110 may forward the data along the bus 137a to the bus 137 of the corresponding hardware device 120 and to the pin 135 of the CPU 130 in the master switch box 110, which can read the status update as though it were from the same hardware device 120 in the master switch box 110. While the foregoing has been described primarily in the context of checking the status of hardware devices 120, it will be understood that the user may also operate the CPU 130 to supply management signals, for example, reset commands, or to implement software and setup configurations to the hardware devices 120 of other member switch boxes 110 in the same manner as the update requests.

Figure 4:
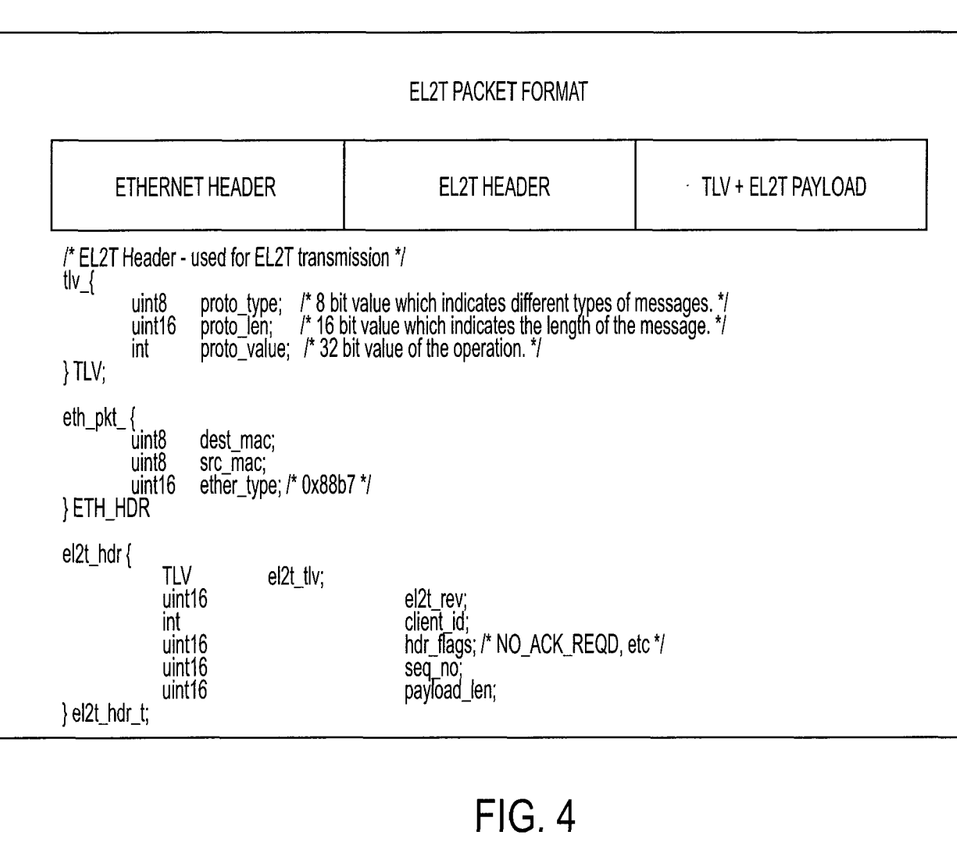
FIG. 4 is a slide showing packet formatting that may be used in message requests in the networking system of FIG. 1.

Referring now to FIG. 4, various examples of packets using the EL2T protocol that may be employed in sending the status request are shown. The EL2T's protocol type may correspond to one of the hardware devices 120 controlled by the FPGA 150 (FIG. 2). The packet format may include an Ethernet header, an EL2T header, and a TLV and EL2T payload for example.

Figure 5:
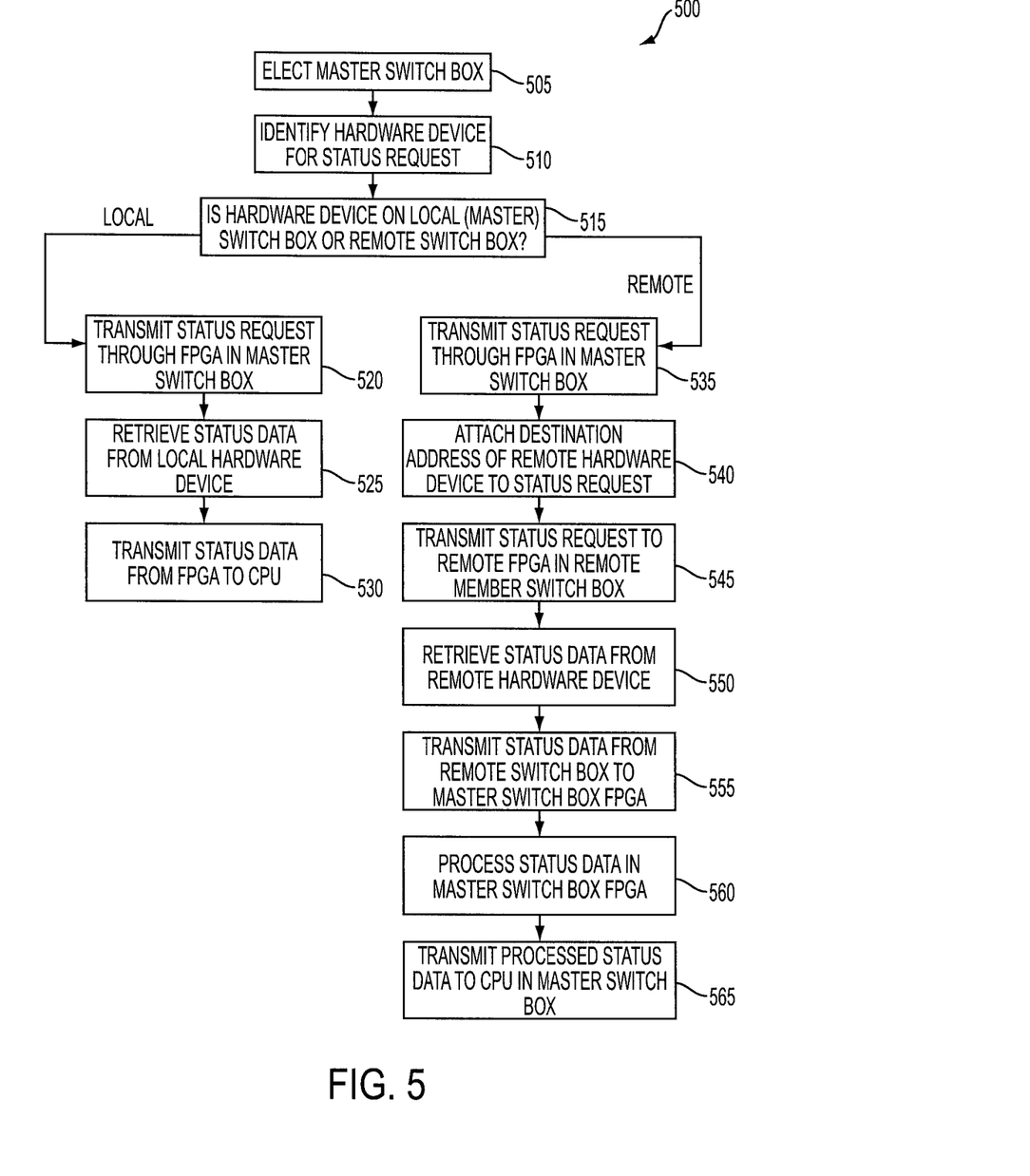
FIG. 5 is a flow chart of a series of steps in a process of managing the network system of FIG. 1 according to another exemplary embodiment of the present invention.

FIG. 5 shows a process 500 of managing a network system 100 through one of the member switch boxes 110. One of the member switch boxes 110 may be elected 505 as a master switch box. The administrator may identify 510 a hardware device 120 or its corresponding slot that needs management or repair. A determination 515 of whether the hardware device is local on the master switch box 100 or on a remote member switch box 110 may be made. If the hardware device 120 is in the master switchbox 110, then a status request or command control message may be transmitted 520 through the processor 150 in the master switch box 110. Status data may be retrieved 525 from the local hardware device 120. Status data may be transmitted 530 from the processor 150 to the CPU 130 where it may be accessed by the administrator. If the hardware device 120 is determined 515 to be located on a remote switch box 110, then the status request or command control message may be transmitted 535 through the FPGA 150 in the master switch box where a destination address of the remote hardware device 120 may be attached 540 to a packet in the status request message and transmitted 545 with the status request message to the processor 150 of the remote member switch box 110. The status data of the remote hardware device 120 may then be retrieved 550, transmitted 555 from the remote member switch box 110 to the master switch box 110, and processed 560 in the master switch box processor 150 where it may be translated for reading by the master switch box CPU 130.

Figure 6:
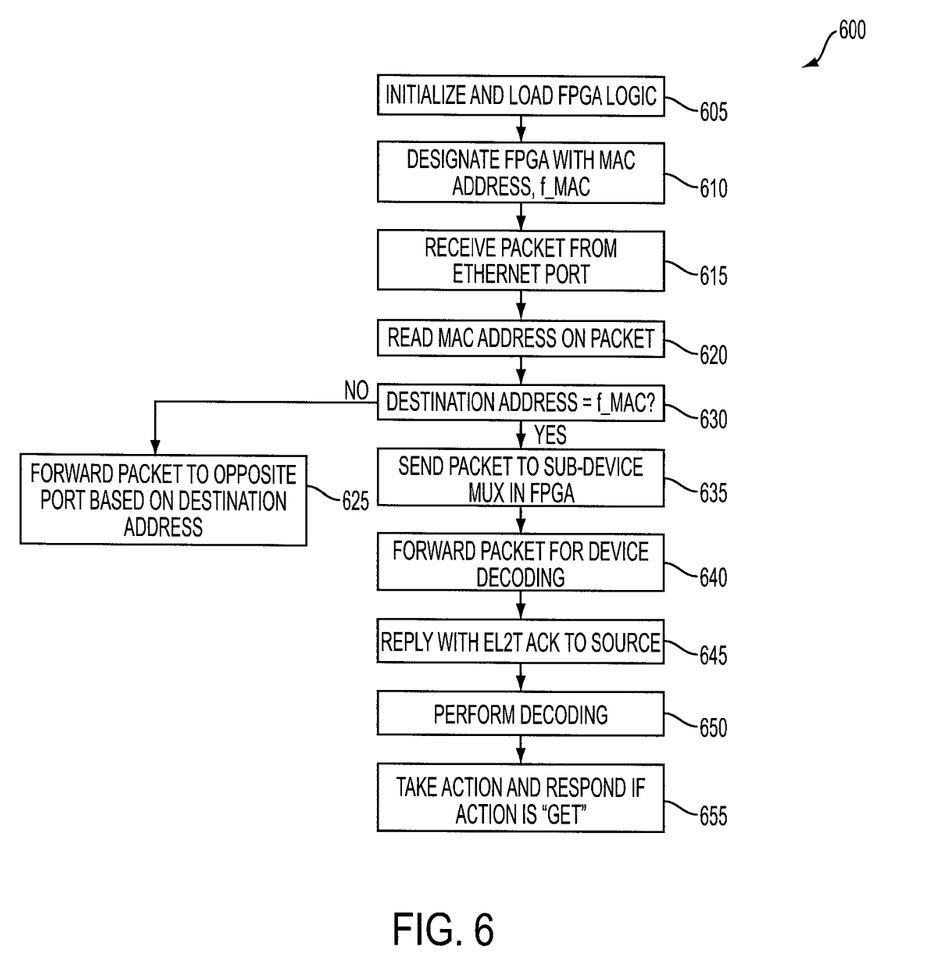
FIG. 6 is a flow chart of a series of steps in a process of message handling in a member switch box according to yet another exemplary embodiment of the present invention.

FIG. 6 shows a process 600 of message handling in a member switch box 110. The FPGA 150 may be initialized and loaded 605 with operating logic. The processor 150 may be designated 610 with a MAC address, "f_MAC". The member switch box 110 may receive 615 a packet from an Ethernet port. The MAC address on the packet may be read 620 and a determination may be made 630 as to whether the destination address corresponds with the MAC address of the processor 150. If the MAC address does not correspond to the processor 150, then the packet may be forwarded 625 to an appropriate management port based on the packet's destination MAC address. If the MAC address does correspond to the processor 150, then the packet may be sent 635 to the sub-device mux 160 and forwarded 640 in the processor 150 for decoding. A reply may be supplied 645 to the source acknowledging receipt of the packet, the packet may be decoded 650 and analyzed for handling, and an action identified and taken 655. For example, if the packet was coded with a "GET" action, then retrieving a status of the hardware device 120 may be performed.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A process of managing device hardware in a clustered network of switch boxes, comprising:
   electing a master switch box configured to manage the cluster of switch boxes as a single switch box via management of MAC (media access control) addresses of the switch boxes;
   transmitting a status request from a central processing unit (CPU) in the master switch box to a hardware device in a member switch box in the clustered network, the status request including a destination address of the hardware device on a management port of the master switch box;
   receiving a status update from the member switch, corresponding to the status request, at a multiplexer device in the master switch box, the multiplexer device configured to map and simulate the status update received from a remote hardware device in a remote switchbox; and
   transmitting the status update from the multiplexer in the master switch box to the CPU in the master switch box, wherein the CPU in the master switch box processes the status update from the remote switch box for a local processor in the master switch box to read the processed status update from the remote hardware device, and wherein the local processor in the master switch box is configured to control the hardware device in the member switch box via feedback information received from the CPU in the master switch box in response to the processed status update.

2. The process of claim 1, wherein the transmission of the status request from the CPU is performed through the management port, in the master switch box, in communication with the multiplexer.

3. The process of claim 2, wherein the receipt of the status request is through said management port.

4. The process of claim 1, including identifying a pin of the processor in the master switch box, and transmitting the status request from the multiplexer to said identified pin.

5. The process of claim 4, wherein the multiplexer is a field programmable gate array (FPGA) configured to translate the status update for reading on a line in communication with said pin.

* * * * *